F. M. FABER.
MANUFACTURE OF TURBINE WHEELS.
APPLICATION FILED JAN. 2, 1903. RENEWED JAN. 22, 1907.
1,039,915.
Patented Oct. 1, 1912.
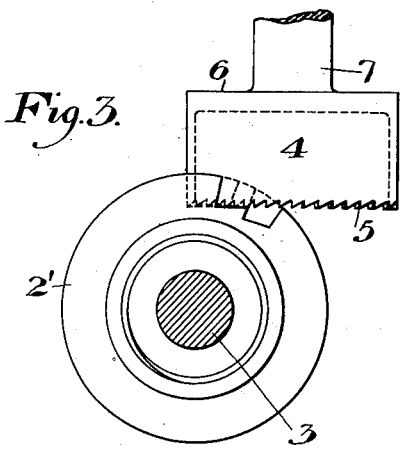
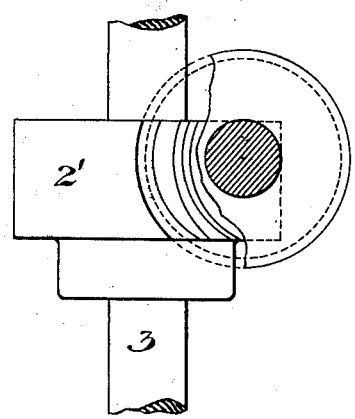
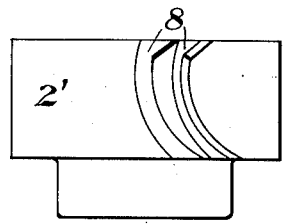
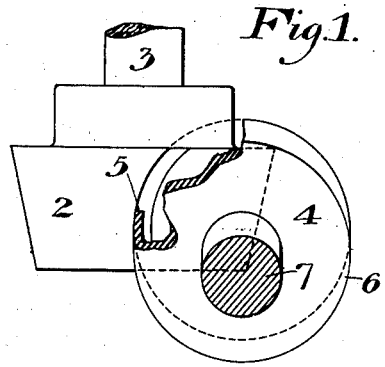
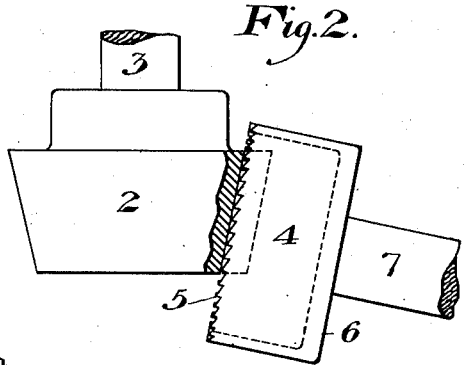
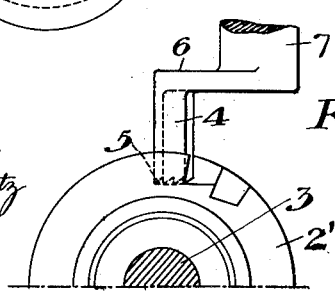
WITNESSES
INVENTOR

UNITED STATES PATENT OFFICE.

FRANK M. FABER, OF PITTSBURGH, PENNSYLVANIA, ASSIGNOR TO W. S. ELLIOTT, OF PITTSBURGH, PENNSYLVANIA.

MANUFACTURE OF TURBINE-WHEELS.

1,039,915.  Specification of Letters Patent.  Patented Oct. 1, 1912.

Application filed January 2, 1903. Serial No. 137,437. Renewed January 22, 1907. Serial No. 353,524.

*To all whom it may concern:*

Be it known that I, FRANK M. FABER, of Pittsburgh, in the county of Allegheny and State of Pennsylvania, have invented a new and useful Improvement in the Manufacture of Turbine-Wheels, of which the following is a full, clear, and exact description, reference being had to the accompanying drawings, forming part of this specification, in which—

Figure 1 is a rear elevation partly broken away, showing the cutting of a conical blank; Fig. 2 is a top plan view of the same, partly broken away; Figs. 3 and 4 are respectively a rear elevation partly broken away, and a side elevation showing the cutting of a cylindrical blank, and Fig. 5 is a view showing the filing or cutting away of the vanes at the entrance end. Fig. 6 shows another form of cutting tool.

My invention relates to the manufacture of turbine wheels and is designed to provide an improved method of slotting a blank to produce curved turbine vanes or blades.

Heretofore in the making of turbine wheels these wheels have been cast in one piece, the vanes being formed in casting. This method is unsatisfactory, as the blades are not accurate in shape, are difficult to machine, and are not similar to each other in shape and size.

My invention overcomes these difficulties, and improves the efficiency of the turbines; and it consists in cutting the blades or vanes from a solid blank by the action of a rotating tool or a cylindrical milling cutter which acts upon the periphery of the blank.

In the drawings, referring to Figs. 1 and 2, 2 represents a solid blank of frusto conical shape, which is mounted upon an arbor 3 so that it may be turned into different positions and locked in such positions to form the successive teeth or vanes. The curved slots are preferably cut by a cylindrical milling tool 4 which consists of a steel ring having a toothed cutting edge portion 5, and a base 6 which is centrally secured to a driving shaft 7. The tool is in the form of a cylinder generated by the movement of a straight line in a circle and always parallel to itself, one element of the cylindrical surface of the tool being radial to the axis of the blank at one point. The diameter of the cylindrical cutter is greater than the width of the periphery of the blank, and as it revolves it is forced against the blank, thus forming a curved slot. When the slot is cut to proper depth the tool is retracted, the blank turned and locked in a new position, and the tool again fed forward to form another curved slot, thus making a vane or tooth between the slots.

In the form of Figs. 1 and 2, it will be noted that the axis of the tool is not at right angles to the axis of the blank; and these two axes do not intersect.

In Figs. 3 and 4 I show the cutter cylinder acting upon the cylindrical blank 2', in which case the axis of the tool lies in a plane at right angles to the axis of the blank. The axis of the tool is at one side of the central transverse plane of the blank, as shown. Inasmuch as the use of a tool or cutter cylinder having sufficient thickness to form a slot at one cut, will form a slot whose bounding walls cut the edge of the blank at widely different angles, owing to the difference in the radii, I prefer to use a thin cylinder which will be moved forward to give a plurality of cuts in making a single slot. These angles are thus brought more nearly like each other. After the slots are cut by the tool I preferably bevel the thick ends of the vanes, as shown at 8 in Fig. 5. This may be done by a file or other suitable tool, and improves the action of the turbine by changing the shape of the inlet.

The advantages of my invention result from the accurate shape of the blades, their uniformity in size and shape, the smooth finished surfaces obtained by the milling tool, and the ease and cheapness of manufacture.

The diameter of the cutter may be varied, the cutter may be made of arc-shape, instead of cylindrical, and the cuts may be varied in form and dimensions, without departing from my invention.

I claim:

1. The herein described method of forming a vane on turbine wheels which consists in making a cut across the periphery of a wheel blank extending from edge to edge thereof by a thin tool, and then shifting the tool and blank angularly relatively to each other to make another similar cut to widen the cut first made; substantially as described.

2. The herein described method of forming a vane on turbine wheels which consists in making a curved cut across the periphery of a wheel blank extending from edge to edge thereof by a thin tool and then shifting the tool and blank angularly relatively to each other to make another similar cut to widen the cut first made; substantially as described.

3. The herein described method of forming a vane on a turbine wheel, which consists in making a curved cut across the periphery of a wheel blank extending from edge to edge thereof by a thin hollow-cylindrical end-cutting tool, the blank and tool being relatively so placed that one element of the cylindrical surface of said tool is radial to the axis of the blank at one point, and then shifting the tool and blank angularly relatively to each other to make another similar cut to widen the cut first made; substantially as described.

4. The herein described method of forming a vane on turbine wheels which consists in making a cut across the periphery of a wheel blank extending from edge to edge thereof by a thin circular tool, and then shifting the tool and blank angularly relatively to each other to make another cut to widen at least a portion of the cut first made; substantially as described.

5. The herein described method of forming a vane on a turbine wheel, which consists in rotating a cutting tool in cutting engagement with the periphery of the blank and in a curved path to form a narrow cut across the periphery of the blank, the axis of the cutting tool being directed obliquely to the axis of the blank, and then shifting the blank and tool angularly relatively to each other to widen the cut first formed by another and similar cut, the tool having a thin cutting edge to minimize the variations due to changes in the cutting angle at different portions of the slot; substantially as described.

In testimony whereof, I have hereunto set my hand.

FRANK M. FABER.

Witnesses:
C. P. BYRNES,
H. M. CORWIN.